May 27, 1969
G. H. COOK ET AL
3,446,131
CAMERA APPARATUS
Filed March 30, 1967
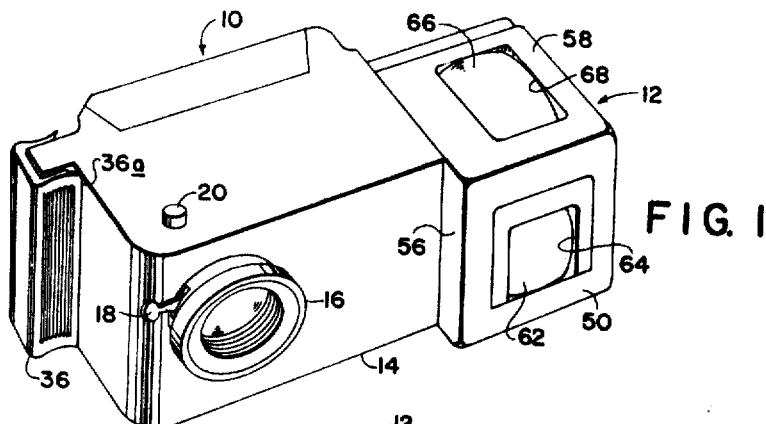
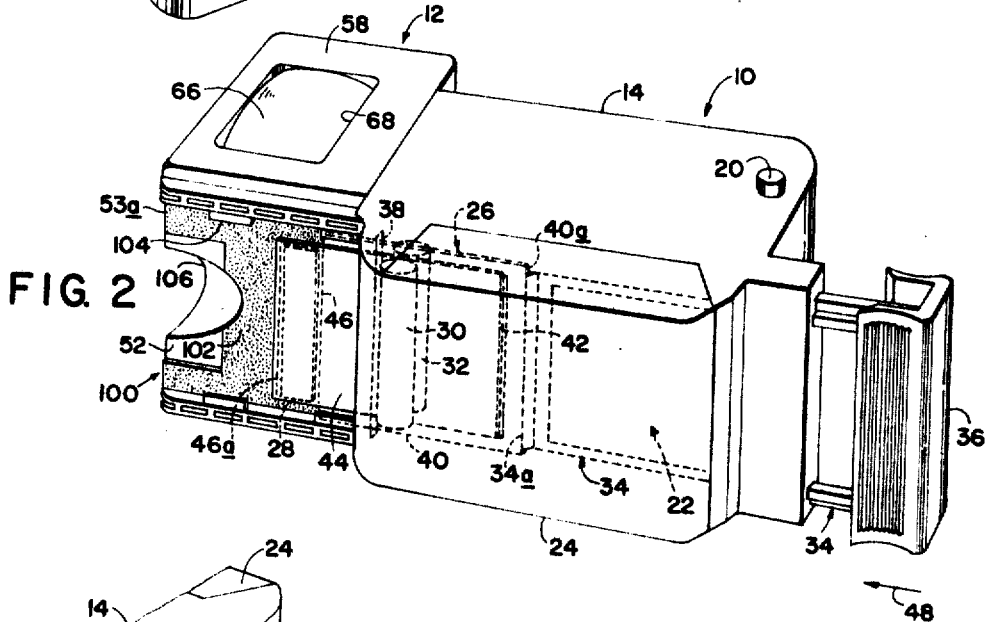
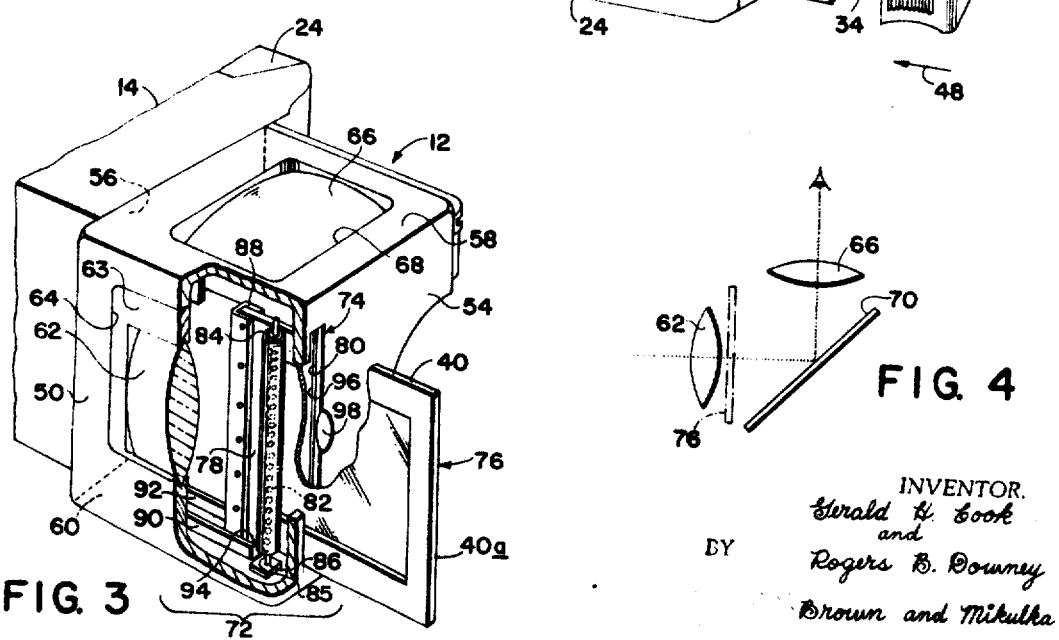
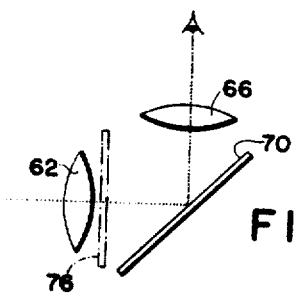
INVENTOR.
Gerald H. Cook
and
Rogers B. Downey
BY
Brown and Mikulka
ATTORNEYS United States Patent Office 3,446,131
Patented May 27, 1969

3,446,131
CAMERA APPARATUS
Gerald H. Cook, Lynnfield, and Rogers B. Downey, Lexington, Mass., assignors to Polaroid Corporation, Cambridge, Mass., a corporation of Delaware
Filed Mar. 30, 1967, Ser. No. 627,155
Int. Cl. G03b 17/50
U.S. Cl. 95—13
10 Claims

ABSTRACT OF THE DISCLOSURE

A miniature camera capable of exposing and processing a plurality of pre-mounted photographic film assemblies. The film assemblies are of a type releasably-containing a liquid processing composition which, when exposed and subjected to transport and compressive means of the camera are adapted to provide finished transparencies suitable for either direct viewing or projection. More particularly, camera apparatus in the form of a compact integral structural element which combines view-finder means serving a conventional function relative to a photographic exposure, a processing or imbibition chamber for receiving each compressed film assembly to complete its processing, and means for viewing the processed transparency when completed to enable an immediate check of its quality. In combining these functions in a single unit, given components serve more than one purpose whereby a compactness of the camera and flexibility of operation are achieved. The external dimensions and shape of the unit are so calculated as to provide a continuity of form with the basic camera housing.

A film assembly of a type generally suitable for use with the camera of the present invention includes photosensitive and image-providing components and a releasably-contained processing liquid. It is of a multilayered structure such that after exposure, release of the liquid by the application of a compressive force to a liquid-containing element of the assembly, spreading of the liquid and imbibition thereof into predetermined layers, including an exposed silver halide emulsion layer, provide a visible image. The image is formed by the diffusion transfer of image-forming substances to a designated image-receiving surface. Such a process is associated with cameras and film materials sold by Polaroid Corporation, Cambridge, Mass., U.S.A. Processing is initiated by moving the film assembly between a pair of compressive components and involves mechanical transport means operating according to a predetermined program. A film assembly particularly adapted to the production of a mounted transparency, as in the instance of the present invention, is described in copending U.S. patent application Ser. No. 516,494, of Rogers B. Downey, filed Dec. 27, 1965, for Photographic Film Assembly.

A processing liquid suitable for use in forming the image may comprise an aqueous solution of a silver halide developer such as hydroquinone, a silver halide solvent of the type of sodium thiosulfate, and an alkaline substance such as sodium hydroxide. It may also preferably include a thickening or film-forming agent such as a synthetic polymer of the type of sodium carboxymethyl cellulose and, possibly, a high-molecular-weight mordant to facilitate the transfer process. In producing a black-and-white image, a latent image is developed; the exposed silver halide is reduced to silver, and the unreduced silver halide forms a soluble silver complex which is transferred from undeveloped areas to the image-receiving surface, the image being formed on the latter in silver. In the production of a color transparency, substances capable of forming dye images at the image-receiving surface such as dyes, color couplers, or the like, may be employed in the transfer process. Or, a black-and-white image in conjunction with a color screen may, advantageously, be employed to provide an image visible substantially in full color. Compressive processing apparatus of the type incorporated with the camera of the present invention is more fully described in copending U.S. patent applications Ser. No. 516,415 filed Dec. 27, 1965, for Photographic Apparatus, and Ser. No. 516,416 filed Dec. 27, 1965, for Camera Apparatus, both in the name of Rogers B. Downey.

Objects of the invention are to provide photographic apparatus for incorporation with a miniature self-processing camera combining in one device or unit both a viewfinder for making the exposure and a viewer for inspecting a finished photographic print; to provide apparatus of the character described combining in an integral unit a viewfinder, a processing chamber for completing formation of the photographic print, and a viewer for inspecting the finished photographic print; and to provide apparatus, as described, which is embodied in a unitary portion or extension of the camera housing, per se.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIGURE 1 is a diagrammatic front perspective view of a miniature camera embodying the apparatus of the invention;

FIG. 2 is a diagrammatic rear perspective view of the camera and unitary apparatus of the invention;

FIG. 3 is a diagrammatic fragmentary front view of the integral viewfinder, viewer and processing chamber, with parts broken away; and FIG. 4 is a diagrammatic side view of the optical system of the unit, illustrating operation of the viewfinder and slide viewer.

Referring now to the drawing, a miniature camera 10, of a self-processing type incorporating the device 12 of the invention is shown from the front in FIGURE 1 and from the rear in FIG. 2. The camera comprises a housing 14 and conventional exposure means as, for example, a lens-shutter-diaphragm assembly 16, a shutter tensioning lever 18, a shutter release 20, and means providing an exposure aperture at 22. The housing may, appropriately, be composed of a metal such as aluminum having a synthetic "leather" covering, or it may be formed of a suitable plastic, for instance, the plastic known as "Delrin," sold by E. I. du Pont de Nemours Co., Wilmington, Del., U.S.A. Another plastic suitable for the purpose is "Acrylafil" sold by Fiberfil, Inc., Evansville, Ind., U.S.A.

A magazine 24 adapted to hold a plurality of pre-mounted miniature film units or assemblies 26, each embodying a processing liquid in a frangible container 28, is releasably-mounted on a rear face of the camera. Assuming it to be loaded and so mounted, the foremost film unit, after the removal from the open front of the magazine of an opaque protective shield or screen, is positioned at the focal plane of the camera so as to be aligned with the exposure aperture of the latter at 22. The camera includes processing mechanism for advancing and compressing each film unit after it has been photographically exposed. This mechanism is shown in FIG. 2 and includes a pair of pressure rolls 30 and 32, a slidably-mounted, frame-like film-transport or pusher element 34 having an angular film-unit contacting component 34a and, attached to the element 34 externally of the camera housing, an actuating handle 36. Assuming a film unit 26 to have been located at the focal plane at aperture 22 and to have been exposed, the handle 36 is then pulled to an extreme outward position to commence the processing operation. The contacting component 34a will then be positioned against the trailing edge of the film mount 40a in readiness to push the film unit laterally between guide means (not shown) at the front of the magazine; between the pressure rolls 30 and 32; and through an exit aperture 38 formed in the camera housing.

The maximum inward position of the pusher 34 is determined by suitable limit-stop means, such as that provided by contact of tip 36a of the handle with the camera housing, as shown in FIGURE 1. The physical structure of the film assembly 26 comprises the aforesaid liquid container 28; the film mount 40 composed of a rigid material such as the plastic "Delrin," previously mentioned; the film component 42 framed within the mount; a cover sheet 44 extending across the rear face of the unit which, alone or in conjunction with an inner layer, excludes ambient light and contributes to the liquid-spreading function; and a leading tapered so-called break-off tab 46 which facilitates entrance of the film unit between the pressure rolls. When the handle 36 has been pushed to its extreme inward position, the processing liquid has, of course, been released and spread completely between the appropriate layers by the pressure rolls 30 and 32. At this position, the trailing portion of the mount 40 is preferably still retained between the pressure rolls, the major portion of the film unit, however, having been advanced through the aperture 38. The condition illustrated in FIG. 2 is to be understood as that in which the handle 36 of the pusher element 34 is undergoing inward movement in the direction of the arrow 48. Accordingly, the film unit 26 is being carried by the pusher element 34 in a simular direction. The processing liquid is being spread between the required layers, and the film unit 26 is passing through the aperture 38 to a location externally of the camera housing, proper.

The element 12, preferably unitary with, but alternatively, separably-attached to the camera 10, is of a generally rectangular shape, as provided by the front wall 50, the rear wall 52, the side walls 54 and 56 and the upper and lower walls 58 and 60, respectively. A generally darkened chamber largely excluding ambient light is thus provided by these walls. The viewfinder component of element 12, in addition to sharing with the slide viewer and in part with the processing chamber in the light-excluding function of the aforesaid walls, includes the frontal lens or objective 62 mounted in the rectangular light-entrance aperture 64 formed in the front wall; the viewing lens or eye-piece 66 mounted in the rectangular aperture 68 provided in the upper wall; and the first-surface mirror 70 positioned intermediately of the lenses within the chamber and so disposed acutely at approximately 45° with respect to the two lenses that their optical axes meet generally centrally of its reflecting surface. Lens 62 may, appropriately, be a positive lens of 2.5" focal length and lens 66 a positive lens of 2.3" focal length. To possess a curvature suitable for its viewfinding function, the lens 62 does not entirely encompass the aperture 64 and is therefore attached to or mounted into a flattened light-transmitting member 63. The viewfinder, as described, offers no significant parallax problem relative to a photographic subject at a distance of 8 feet or greater. It will be understood that parallax compensating means, while not included for reasons of simplicity and cost savings, could be provided.

The transparency or slide viewer component of the element 12 comprises the lens element 66, the mirror 70, and the semi-enclosing walls previously described with respect to the viewfinder. To meet the slide viewing requirements, it will be understood that the light-entrance aperture 64 is dimensioned at least equal to and preferably slightly larger than the picture area of the finished transparency as, for example, to measure 1½" x 1½", or some other chosen dimensions. In addition to the lens elements and mirror, the slide viewer comprises slide-mounting means 72 including the slot-like aperture 74 formed in the wall 54 for slidably receiving a finished mounted transparency or slide 76, a displaceable translucent light-diffusing screen 78 for scattering light entering the aperture 64; limit stop means provided by the wall 56 for determining the depth to which the slide can be inserted in the slot 74; retaining means 80 in the form of an overhanging edge or lip of the wall 54 of a reduced thickness, for holding the slide in slot 74; and torsion spring means 82 for cooperating in the operation of the diffusing screen 78 and for assisting in ejecting the slide from slot 74 after it has been inspected.

Further considering the structure of the slide-mounting means 72 and the diffusing screen 78, the latter is composed of a thin flexible, translucent sheet material, such as the plastic Mylar. It is normally coiled completely on a drum 84 having stub shafts 85 mounted for rotation at 86, as provided by the torsion spring 82. The free end of the screen 78 is attached to an elongated U-shaped channeled or slotted member 88 which is adapted to slidable movement across the front of the element 12, that is, just to the rear of aperture 64, within a channel provided by front and rear guide means 90 and 92. When element 12 is employed as a viewfinder, the diffusing screen is tightly wound on the drum 84 as provided by the torsion spring 82 and the slotted member 88 is drawn against the stops 94, thus clearing the aperture 64 for its viewfinder function.

When a mounted transparency 76 is inserted in the slot 74, its leading edge is caused to enter the channel of member 88. The mounted transparency 76 is pushed inwardly, thereby carrying the member 88 with it so as to uncoil the diffusing screen 78 and increasingly tension the torsion spring 82. The diffusing screen is thus positioned in front of and completely across the transparency, namely, between it and the aperture 64 and lens 62 mounted therein. The mounted transparency 76 is pushed inwardly to a predetermined maximum depth provided by limit stop means such as that brought about by its contact with the wall 66. At this depth, the trailing edge 40a of the transparency mount is positioned within the slot 74 and slightly beyond the overhanging edge 80. At this location, the trailing edge 40a of the transparency mount is moved slightly to one side, namely, to the right as shown in FIG. 3. It is thus brought into contact with the flange 96 projecting inwardly at 90° from wall 54 and is behind the overhanging lip 80, being held firmly against the latter by the bias applied by torsion spring 82 through the medium of the diffusing screen. The transparency is thus held firmly positioned for viewing purposes. The diffusing property of screen 78 is so chosen that the joining lines between lens 62 and the flattened light-transmitting portion 63 are not noticeable. To release the transparency, its trailing edge 26a is merely moved sideways, that is, to the left in FIG. 3, as facilitated by the indention 98 formed in wall 54, the aforesaid bias of spring 82 transmitted by the diffusing screen to slotted member 88, contributes to its manual removal or ejection.

Completing the structure of the element 12 is the semi-enclosing processing or imbibition chamber 100, occupying its rear portions. The chamber, comprises the rear surface of the wall 52; the light-shielding material, such as a resilient piled fabric 102, bonded thereto; the flange members 104 slightly spaced from fabric 102 and providing channeled portions between their inner surfaces and the fabric 102; and the recess 106 formed in the wall 52. The chamber 100 is adapted to receive each film unit 26 as it is passed through the slot 38 by the pusher element 34, after its photographic exposure and subsequent compression by the pressure rolls 30 and 32. As previously intimated, at this stage the processing liquid has been released from the frangible container 28 and spread between internal layers of the film unit to initiate the diffusion transfer process of image formation. A few seconds are required to complete imbibition of the liquid to appropriate layers and transfer of image-forming substances to an image-carrying layer. The chamber 100 provides a protective environment for this purpose, the open front surface of the film unit being protected against ambient light by the piled fabric 102 and the rear surface thereof by the cover sheet 44 and an opaque stripping layer attached to its inner surface.

Assuming the pusher element 34 to have completed its inward travel, the trailing edge 40a of the film mount is still releasably held between the pressure rolls 30 and 32, the longitudinal margins of the film-unit mount are positioned between the flange members 104 and the piled fabric 102, and the leading edge 46a of the break-off tab is approximately flush with the edge 52a of the chamber wall. The film unit is firmly held against other than slidable removal from chamber 100 by the flange members 102. As soon as the required time for completing processing the film unit has been reached, the break-off tab 46 is manually grasped, bent rearwardly, and broken away from the film-unit mount 40, carrying with it the cover sheet, the stripping layer and the film emulsion. This leaves the mounted transparency bearing a visible image still within the chamber. It is then manually gripped, using the recess 106 to more easily secure the leading portions of the mount, and is slidably removed from the chamber. It is then adapted to be viewed, as described with respect to the viewing means of FIG. 3.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Photographic apparatus for incorporation with a miniature camera adapted to expose and process a plurality of pre-mounted film units of a type releasably-containing a liquid processing composition, said film units when exposed and processed providing finished transparencies suitable for either direct viewing or projection, said apparatus comprising viewfinder means including a plurality of interconnecting enclosing walls providing a generally rectangular chamber substantially excluding ambient light, means forming a first light-entrance aperture in a front wall and a second viewing aperture in an upper wall thereof, a positive lens of given focal length constituting an objective mounted in said first aperture, a positive lens of given focal length constituting an eye-piece mounted in said second aperture, and a reflecting element mounted intermediately of said lenses and disposed at at least one given acute angle relative thereto, the optical axes of said lenses meeting one another approximately centrally of said reflecting element, and transparency viewing means for inspecting transparencies produced by said camera in conjunction with said viewfinder means including, in combination with said walls, apertures, eyepiece, and reflecting element of said viewfinder means, means adapted to intersect the optical axis of said objective between said objective and said reflecting element for mounting each of said transparencies, and a light-diffusing screen removably-positioned at that side of said transparency mounting means which is nearest to said objective.

2. Photographic apparatus, as defined in claim 1, wherein said transparency mounting means includes an elongated slot formed in one of said walls and wherein said light-diffusing screen is removably-positioned between said objective and said transparency mounting means.

3. Photographic apparatus, as defined in claim 2, wherein said reflecting element is disposed at approximately 45° to said lenses.

4. Photographic apparatus as defined in claim 3, wherein said objective has a focal length of approximately 2.5 inches and said eye-piece has a focal length of approximately 2.3 inches.

5. Photographic apparatus, as defined in claim 2, wherein said light-diffusing screen is composed of a thin flexible plastic material attached at one end to a rotatable drum, said drum being biased for rotation in a direction to coil said screen thereon by a torsion spring.

6. Photographic apparatus, as defined in claim 5, wherein an elongated channeled member is attached to that end of said light-diffusing screen opposite to said end which is attached to said drum, said channeled member being adapted to receive the leading edge of a transparency upon its insertion into said slot.

7. Photographic apparatus, as defined in claim 6, wherein said elongated channeled member is adapted to slidable translational movement laterally across the front portion of said transparency viewing means to an inward location determined by limit stop means.

8. Photographic apparatus as defined in claim 6, wherein movement of said elongated channeled member and uncoiling of said light-diffusing screen are actuated in response to manual pressure exerted against a transparency when inserted in said slot against the bias exerted by said torsion spring through the medium of said screen and channeled member, said transparency being held inwardly at its completely mounted position by a lip at one edge of said slot against which the trailing edge of said transparency is adapted to be brought into contact.

9. Photographic apparatus for incorporation with a miniature camera adapted to expose and in part process a plurality of pre-mounted film units of a type releasably-containing a liquid processing composition, said film units when exposed and processed providing finished transparencies suitable for either direct viewing or projection, said apparatus comprising viewfinder means including a plurality of interconnecting enclosing walls providing a generally rectangular chamber substantially excluding ambient light, means forming a first light-entrance aperture in a front wall and a second viewing aperture in an upper wall thereof, a positive lens of given focal length constituting an objective mounted in said first aperture, a positive lens of given focal length constituting an eye-piece mounted in said second aperture and a reflecting element mounted intermediately of said lenses and disposed at at least one given acute angle relative thereto, the optical axes of said lenses meeting one another approximately centrally of said reflecting element, transparency viewing means for inspecting transparencies produced by said camera in conjunction with said viewfinder means including, in conjunction with said walls, apertures, eye-piece and reflecting element of said viewfinder means, means adapted to intersect the optical axis of said objective between said objective and said reflecting element for mounting each of said transparencies and a light-diffusing screen removably-positioned between said objective and said transparency mounting means, and a processing chamber comprised in part by the external surface of a rear one of said walls for receiving each of said film units as it is advanced thereinto from compressive processing means of said camera, said processing chamber being adapted to hold each said film unit to enable completion of its processing.

10. Photographic apparatus, as defined in claim 9, wherein said processing chamber includes a piled light-shielding material bonded to said rear wall and a plurality of flange elements overlying said light-shielding material and slightly spaced therefrom for slidably accepting and releasably retaining each said transparency between said elements and said light-shielding material, said processing chamber being located adjacent to a slot formed in the housing of said camera through which each said film unit is advanced from said compressive processing means and introduced along its marginal portions between said flange elements and light-shielding material.

References Cited

UNITED STATES PATENTS

| | | | |
|---|---|---|---|
| 2,854,903 | 10/1958 | Land et al. | 95—13 |
| 3,097,584 | 7/1963 | Wright | 95—12 |

NORTON ANSHER, *Primary Examiner.*

CHARLES B. FUNK, *Assistant Examiner.*

U.S. Cl. X.R.

40—64